United States Patent [19]

Hnizdor

[11] Patent Number: 5,097,621
[45] Date of Patent: Mar. 24, 1992

[54] LACQUER OVERLAY WET PROCESS FOR ARTIFICIAL FLY BODIES

[76] Inventor: Thomas A. Hnizdor, 9164 Brady, Redford, Mich. 48239

[21] Appl. No.: 551,742

[22] Filed: Jul. 12, 1990

[51] Int. Cl.⁵ ............................................. A01K 85/00
[52] U.S. Cl. .................. 43/42.32; 43/42.33; 43/42.34; 43/42.25; 43/42.53
[58] Field of Search ................. 43/42.32, 42.33, 42.34, 43/42.25, 42.53

[56] References Cited

U.S. PATENT DOCUMENTS

| Re. 17,654 | 4/1930 | Weber | 43/42.32 |
|---|---|---|---|
| 1,323,458 | 12/1919 | Dills | 43/42.33 |
| 1,385,627 | 7/1921 | Lane | 43/42.32 |
| 1,430,642 | 10/1922 | Gross | . |
| 1,555,029 | 9/1925 | Russell | 43/42.32 |
| 1,639,863 | 8/1927 | Sinclair | 43/42.32 |
| 1,698,964 | 1/1929 | Pagin | 43/42.34 |
| 1,787,733 | 1/1931 | Pagin | 43/42.34 |
| 2,231,949 | 2/1941 | Rinehart | 43/48 |
| 2,754,612 | 7/1956 | Means | 43/42.25 |
| 3,082,562 | 3/1963 | Duncan | 43/42.15 |
| 3,367,060 | 2/1968 | Abercrombie | 43/42.33 |
| 3,959,060 | 5/1976 | Jones | 156/245 |
| 4,163,337 | 8/1979 | Kress | 43/42.05 |
| 4,216,605 | 9/1980 | Showalter | 43/42.53 |
| 4,380,884 | 4/1983 | Pond | 43/42.09 |
| 4,437,257 | 3/1984 | Kluge | 43/42.45 |

FOREIGN PATENT DOCUMENTS 476966  9/1951  Canada ......................... 43/42.32

Primary Examiner—Kurt Rowan
Attorney, Agent, or Firm—Basile and Hanlon

[57] ABSTRACT

A method of applying a design, such as a simulated live fish design, onto an artificial fly body includes the step of applying a base layer of lacquer over the entire primed exterior surface of a buoyant artificial fly body. A first overlay of a lacquer is applied in a predetermined pattern, i.e., stripes, dots, etc., at predetermined discrete locations on the artificial fly body while the base layer is still wet. While the first overlay of lacquer is still wet, a second overlay of a lacquer is applied over the first overlay. The second overlay mixes with the first overlay of lacquer and flows outward from its point of initial application to a boundary spaced from the edge of the first overlay. A peripheral edge portion of the first overlay remains exposed around the second overlay. Finally, a clear layer of lacquer is applied over the entire artificial fly body after all of the overlays are dry. A third overlay may be optionally applied over certain of the second overlays, while the second overlays are still wet, to simulate other patterns, such as eyes, found in live fish.

7 Claims, 1 Drawing Sheet

LACQUER OVERLAY WET PROCESS FOR ARTIFICIAL FLY BODIES

BACKGROUND OF THE INVENTION

1. Field of the Invention:

The present invention relates, in general, to artificial fly bodies and, more specifically, to artificial fly bodies having decorative designs applied to the exterior surface thereof.

2. State of the Art:

Artificial flys are typically formed in various colors and with various designs to attract predator fish. Typical designs include those which simulate the appearance of a live bait fish or fingerling.

Such designs are typically hand painted onto an artificial fly body and include eyes, scales, stripes, bars, dots, etc. Each layer or design feature is allowed to dry before the next layer is applied thereover.

This technique creates a problem with artificial fly bodies which are required be a light in weight and a smooth aerodynamic surface. The use of separate layers results in discrete dots, lines or bars, etc., on the surface of the artificial fly body. Furthermore, it is extremely difficult, without time consuming and precise efforts, to create a halo effect in which a thin circle of one color surrounds an inner circle or bead of a different color to simulate such patterns found on live bait fish or fingerlings. In addition, the distinct beads and material buildup results in bumps or projections on the fly body which detract from the smooth, aerodynamic shape required for easy and accurate casting and, more importantly, add considerable weight to the fly which is directly opposed to the crucial requirement that the artificial fly have the lightest weight possible.

SUMMARY OF THE INVENTION

The present invention is a lacquer overlay wet process or method for artificial fly bodies in which a decorative design is applied to an artificial fly body to simulate an attractor pattern or the actual design of a live bait fish.

The method includes the steps of:
1. applying a base layer of a lacquer over the entire primed peripheral surface of an artificial fly body,
2. applying a first overlay of a lacquer in a first design pattern on a predetermined portion of the body while the base layer is still wet, and
3. while the first overlay of lacquer is still wet, applying a second overlay of a lacquer in a smaller quantity than the quantity employed in the first overlay onto the first overlay such that the second lacquer overlay flows outward from its point of initial application toward the peripheral edge of the first overlay; but remains spaced from the peripheral edge of the first overlay leaving a peripheral rim portion of the first overlay visible completely around the peripheral edge of the second overlay.

In a preferred embodiment, after each of the first and second overlays is completely dry, the method of the present invention also includes the step of applying a layer of a clear material, such as a lacquer, an epoxy, etc., over the entire peripheral surface of the body.

An optional third overlay of lacquer may be applied to selected ones of the second overlays, while the second overlays are still wet, to form other designs or patterns simulating those found on live fish. The third overlay is particularly suited for forming simulated eyes on the artificial fly body.

The overlays of lacquer may be applied in any pattern, such as stripes, lines, bars, or overlapping dots of, preferably, different colors. In the present method, the artificial fly body may be reoriented during the application of the various overlays of lacquer, as needed, to cause the second overlays of lacquer to flow into the desired shape or position on the first overlays to achieve the desired pattern on the artificial fly body.

The method of the present invention results in a design on an artificial fly body which simulates the design found on a live bait fish or fingerling. In addition, the design may take the form of any attractor pattern to attract predator fish.

The method of the present invention also results in an artificial fly body having a predetermined design which more closely simulates the patterns found in live fish, such as the halo effect in which a thin rim portion of one color surrounds an inner circle or dot of a different color.

Finally, the method of the present invention enables an artificial fly body to have a smooth, aerodynamic shape without any bumps or protrusions. In addition, the multiple overlays and layers of lacquer are applied to the artificial fly body in much smaller quantities than if such layers were separately applied over dry layers to reduce material buildup on the artificial fly body thereby resulting in a desired minimal weight for the artificial fly body crucial for proper casting of the artificial fly.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
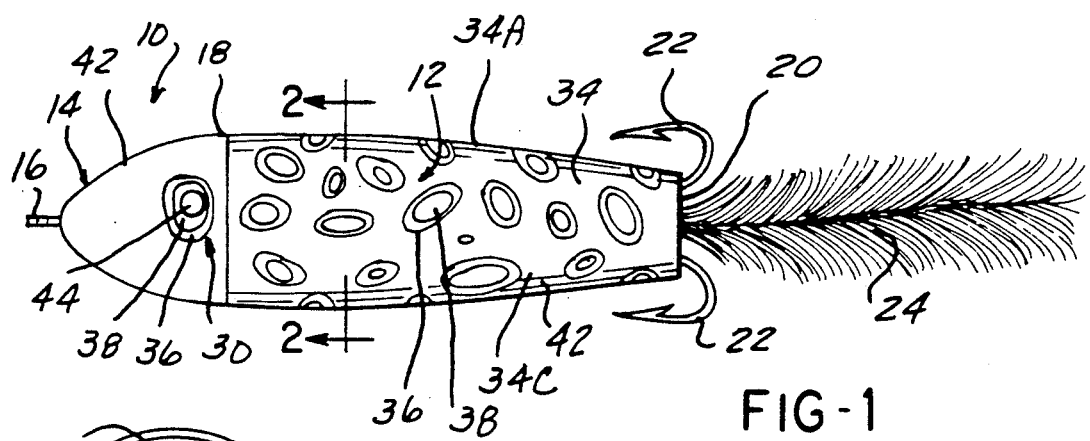
FIG. 1 is a front elevational view of an artificial fly body constructed in accordance with the teachings of the present method.

Referring now to the drawing, and to FIG. 1 in particular, there is illustrated an artificial fly 10 having a design applied to the exterior surface thereof in accordance with the steps of the present method described hereafter.

The artificial fly 10 includes a body 12 having any predetermined shape. By way of example only, the body 12 has a generally "torpedo" shape formed with a conically-shaped first or head end 14.

The exterior surface of the head end 14 tapers outwardly behind the hook eye 16 to an enlarged portion denoted by reference number 18 in FIG. 1. The peripheral walls or surface of the body 12 then taper gradually inward from the enlarged portion 18 to a second or tail end 20 which has a smaller diameter than the enlarged portion 18.

The body 12 may be formed of any suitable floatable or buoyant material, such as cork, plastic, styrofoam, etc.

One or more hooks 22 are embedded or otherwise mounted in the body 12. By way of example, the body 12 is forced over the shanks of the hooks 22 until the hook eye 16 at one end of the shanks protrudes from the head end 14 and the tail end 20 of the body 12 is located adjacent the curved bend in the hooks 22. The hooks 22 may take any suitable, conventional form. In a preferred embodiment, two hooks 22 are arranged in a tandem, double offset arrangement, described in greater detail in U.S. Pat. No. 4,914,852, the contents of which are incorporated herein by reference.

Finally, a tail dressing 24 is attached, such as by means of a suitable adhesive, to the shank(s) of the hooks 22 at the tail end 20 of the body 12. The tail dressing 24 may take any suitable shape and may be formed, by way of example only, of individual, flexible strands, feathers, etc., which are attached at one end to the shanks of the hooks 22 at the tail end 20 of the body and extend outward therefrom.

The method of the present invention utilizes a unique lacquer overlay wet process for applying a decorative design to the artificial fly body 12. The design on the artificial fly body 12 may take any shape, such as an accurate imitation of a small bait fish or fingerling, such as a brook trout, brown trout, etc. Also, the design may be in the form of an attractor pattern which has no relation to a known species of fish.

The design or pattern may include one or more of the following separate features or elements: stripes, lines, bars, dots, etc. These features are applied to various locations on the external surface of the artificial fly body 12 to form the complete pattern.

According to the present method, a halo effect is created by two overlaid beads in which a peripheral rim portion of one bead surrounds an inner bead or circle, such as typically found in small fingerlings. In addition, conventionally shaped, simulated eyes 30 may be placed on the artificial fly body 12 as a third overlay as described hereafter.

Figure 2:
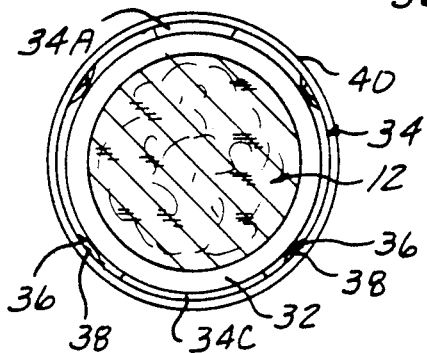
FIG. 2 is an enlarged cross-sectional view generally taken along line 2—2 in FIG. 1.
Figure 3A:
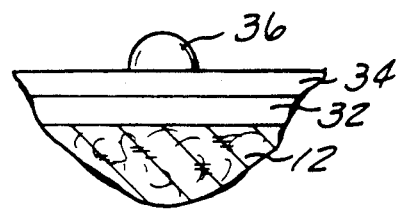
FIGS. 3A-3E are enlarged, cross-sectional views showing the sequential steps of the method of the present invention in applying a design to an artificial fly body.

The first step, FIGS. 2 and 3A, in the method of applying a design to the artificial fly body 12 is the step of applying a coat or layer 32 of a primer material over the entire exterior surface of the body 12 to waterproof the body 12 before the application of lacquer thereto. In the next step, a base layer 34 of a lacquer is applied to substantially all of the exterior surface of the body 12, as shown in FIGS. 1, 2 and 3A-3E. The base layer 34 serves as a background layer of color on the body 12 and may comprise a single color or multiple colors arranged in bands 34A, 34B, 34C and 34D running the length of the body 12 to simulate the back, sides and belly coloration of a live fish.

While the base layer 34 of lacquer is still slightly wet or tacky, a first overlay 36 is applied thereover in a predetermined pattern as shown in FIG. 3A. By way of example only, the first overlay 36 is applied in individual, randomly spaced dots or beads.

The term "overlay" as used in this invention is defined as a thin layer of a paint, lacquer, primer, etc., which is applied over another material layer previously applied to the body 12. Furthermore, the time period for application of the first overlay 36 on the base layer 34 is shortly after the initial application of the base layer 34 such that the base layer 34 is no longer completely wet; but before the base layer 34 is completely dry. It has been found that an ideal time for application of the first overlay 36 on the base layer 34 is between two minutes and three minutes after the application of the base layer 34 to the primed body 12.

Figure 3B:
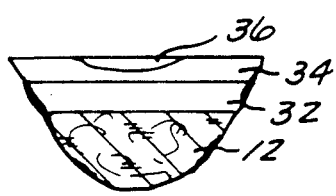

The first overlay 36 is applied as a bead on the body 12 such that gravity and surface tension cause the first overlay 36 to flow outward from its initial point of application as a bead in FIG. 3A into a random shape, such as a circle, completely mixed with the base layer 34. Since the first overlay 36 is applied to the base layer 34 while the base layer 34 is still slightly wet or tacky, all of the first overlay 36 mixes with the base layer 34 to form a flush surface with the base layer 34 as shown in FIG. 3B.

Figure 3C:
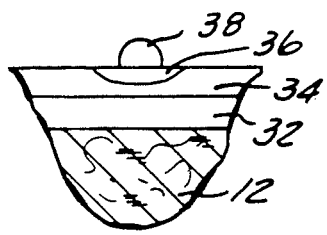
Figure 3D:
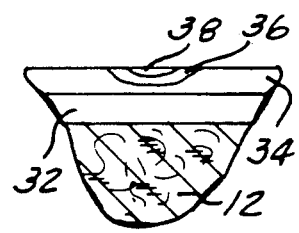

While the first overlay 36 is still slightly wet or tacky, i.e., between two and three minutes after the initial application of the first overlay 36 on the body 12, a second overlay 38 of lacquer is applied directly over at least some, and preferably, all of the first overlays 36 as shown in FIG. 3C. Preferably, the second overlays 38 are applied in smaller quantities than the quantity of the associated first overlays 36. Each of the second overlays 38 flows outwardly under the influence of gravity to mix with and cover a large portion of the associated first overlay 36. However, surface tension and the tacky nature of the first overlay 36 will contain the peripheral extent of the flow of the second overlay 38 within the boundaries of the first overlay 36 such that a peripheral edge or "halo" portion of the first overlay 36 will be visible around each second overlay 38 as shown in FIGS. 1, 2 and 3D. This creates a "halo" effect commonly found in small bait fish or fingerlings thereby creating a pattern closely simulating such live fish. Furthermore, the outward flow of the second overlays 38 causes the initial bead of the second overlays 38 to flatten and form a smooth surface with the first overlay 36 as shown in FIG. 3D.

It should be noted that during the application of each of the individual layers 34, 36 and 38 of lacquer, the artificial fly body 12, which is typically mounted in a suitable holder, may be rotated causing each of the overlays to flow in a desired direction to create a specific pattern, such as an elongated or oval shaped dot, as compared to a completely circular dot.

In an exemplary embodiment, each of the lacquer layers 34, 36 and 38 is of a different color. Such colors may be completely distinct colors or merely shading or hue variations of the same color. Further, as shown in FIG. 2, as part of the base layer 34, a thin strip or line 34C of a light colored lacquer, such as white, may be applied to the bottom of the artificial fly body 12 simultaneously with a back strip or portion 34A and opposed side stripes or portions 34B of the base layer 34 to simulate the light colored belly of a live fish. The back stripe 34A can be, for example, of a dark color and the side stripes 34B of identical colors different from the dark back stripe 34A to simulate the coloring of a live fish.

The lacquers employed in each of the overlays 36 and 38 and the base layer 34 of the present method may be any commercially available lacquer, such as lacquers sold by Wapsi Fly Company.

Figure 3E:
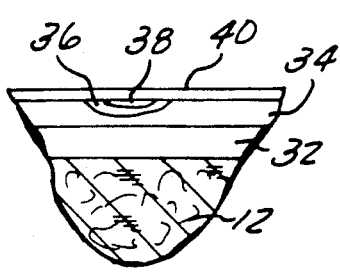

Finally, after the second overlay 38 has completely dried, a clear coat or layer 40 of a "Gloss Coat", such as one sold by Wapsi Fly Company, may be applied over the entire surface of the artificial fly body 12, as shown in FIG. 3E, to add a gloss or sheen to the artificial fly 10.

Figure 4A:
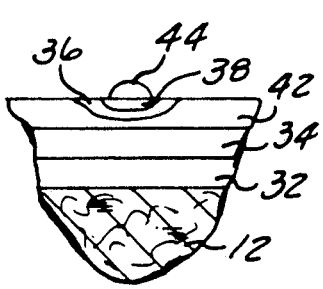
FIGS. 4A and 4B are enlarged, cross-sectional views showing optional steps in the method of the present invention.
Figure 4B:
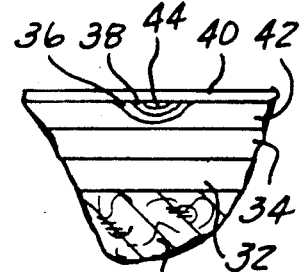

The conical head portion 14 of the artificial fly body 12 may also have a distinctly colored lacquer overlay 42 applied thereto as shown in FIGS. 4A and 4B. This overlay 42 may be applied onto the conical head portion 14 over the base layer 32 while the base layer 32 is still slightly wet or tacky. First and second overlays 36 and 38, respectively, may be applied to the overlay 42 according to the method described above to form the boundaries and main portions of a design simulating the eyes of a live fish.

As shown in FIG. 4A, a third overlay 44, initially in the form of a bead, is applied over the second overlay 38. Gravity causes the third overlay 44 bead to flow outward and flatten while mixing completely with the second overlay 38 to form the pupils of the simulated eye as it forms a contiguous, flat surface with the overlay 42 as shown in FIG. 4B. Finally, the clear gloss coat or layer 40 applied over the entire body 12 will cover the simulated eye shown in FIG. 4B and the remainder of the artificial fly body 12.

The method of the present invention creates an artificial fly body having a distinctive pattern, such as one simulating a live bait fish or fingerling, with minimal material thickness and material weight. This results in an artificial fly body having the desired light weight and smooth, aerodynamic shape for easy and accurate casting.

What is claimed is:

1. A method of applying a design to an artificial fly body comprising the steps of:
    applying a base layer of lacquer over the entire exterior surface of the artificial fly body;
    while the base layer is still wet, applying a first overlay of a lacquer in a first design on a predetermined portion of the body such that the first overlay flows and mixes with the still wet base layer to form a single continuous layer with the base layer; and
    while the first overlay of lacquer is still wet, applying a second overlay of a lacquer onto the first overlay such that the second overlay flows and mixes with the still wet first overlay to form a single continuous layer with the first overlay.

2. The method of claim 1 further including the step of:
    after the first and second overlays are dry, applying a layer of a clear material over the entire peripheral surface of the body.

3. The method of claim 1 wherein the first and second overlays of lacquer are of different color.

4. The method of claim 1 further including the step of:
    applying a plurality of first overlays in a predetermined design at spaced, discrete locations on the body; and
    while each of the first overlays of lacquer is still wet, applying a second overlay over at least certain of the first overlays in a smaller quantity than the quantity of the associated first overlay.

5. The method of claim 1 wherein:
    the second overlay of lacquer is applied onto one of the first overlays in a smaller quantity than the quantity of the associated first overlay such that the second overlay flows outward from its point of initial application toward but is spaced from the peripheral edge of the first overlay leaving a peripheral portion of the first overlay visible about the peripheral extent of the second overlay.

6. The method of claim 1 further comprising the steps of:
    while the second overlay is still wet, applying a third overlay of lacquer onto at least one of the second overlays such that the third overlay flows and mixes with the second overlay to form a single continuous layer with the second overlay.

7. A method of applying a design to an artificial fly body comprising the steps of:
    applying a base layer of lacquer over the entire primed exterior surface of the artificial fly body;
    while the base layer is still wet, applying a plurality of first overlays in a predetermined design at spaced, discrete locations on the body such that the first overlays flow and mix with the base layer to form a single continuous layer with the base layer;
    while each of the first overlays are still wet, applying a second overlay over at least certain of the first overlays in a smaller quantity than the quantity of the associated first overlay such that the second overlay flows outward from its point of initial application toward and mixes with the first overlay to form a single continuous layer with the first overlay but is spaced from the peripheral portion of the first overlay such that a peripheral portion of the first overlay is visible about the peripheral extent of the second overlay;
    while the second overlays are still wet, applying a third overlay over at least certain of the second overlays such that the third overlays flow and mix with the second overlays to form a single continuous layer with the second overlays; and
    after the first, second and third overlays are dry, applying a layer of a clear material over the entire peripheral surface of the body.

* * * * *